US012803361B2

(12) United States Patent
Kuniyil et al.

(10) Patent No.: US 12,803,361 B2
(45) Date of Patent: Nov. 17, 2026

(54) SEALING COVERS FOR ACTUATOR MOTORS

(71) Applicant: Illinois Tool Works Inc., Glenview, IL (US)

(72) Inventors: Nidhin Kuniyil, Maharashtra (IN); Virupaxi Payannavar, Maharashtra (IN); Amit Namannavar, Maharashtra (IN); Murali Namanna, Maharashtra (IN)

(73) Assignee: Illinois Tool Works Inc., Glenview, IL (US)

( * ) Notice: Subject to any disclaimer, the term of this patent is extended or adjusted under 35 U.S.C. 154(b) by 239 days.

(21) Appl. No.: 18/642,057

(22) Filed: Apr. 22, 2024

(65) Prior Publication Data

US 2024/0364177 A1 Oct. 31, 2024

(30) Foreign Application Priority Data

Apr. 25, 2023 (IN) ............................ 202311029819

(51) Int. Cl.
*H02K 5/10* (2006.01)
*H02K 5/16* (2006.01)
*H02K 5/24* (2006.01)

(52) U.S. Cl.
CPC ................ *H02K 5/10* (2013.01); *H02K 5/16* (2013.01); *H02K 5/24* (2013.01)

(58) Field of Classification Search
None
See application file for complete search history.

(56) References Cited

U.S. PATENT DOCUMENTS

2005/0023369 A1* 2/2005 Schaupp .................. B05B 5/04 239/3
2013/0154402 A1* 6/2013 Basavarajappa ......... H02K 5/10 310/20
2014/0213718 A1* 7/2014 Kulkarni ............... C09J 175/04 524/506
2015/0285132 A1* 10/2015 Chekansky ............ F02B 39/00 415/144
2018/0229760 A1* 8/2018 Rey ..................... B62D 5/0403

(Continued)

FOREIGN PATENT DOCUMENTS

JP 2001025205 A * 1/2001

OTHER PUBLICATIONS

JP-2001025205-A Machine Translation (Year: 2001).*

*Primary Examiner* — Oluseye Iwarere
*Assistant Examiner* — Masoud Vaziri
(74) *Attorney, Agent, or Firm* — McAndrews, Held & Malloy, Ltd.

(57) ABSTRACT

A sealing cover for an actuator motor includes a base part, a first web, a second web, and a bellows. The base part encloses a top portion and a bottom portion of the actuator motor. The first web partially encloses a first side portion of the actuator motor and the second web partially encloses a second side portion of the actuator motor. The second side portion is opposite to the first side portion. The first side portion and the second side portion are perpendicular to the top portion and the bottom portion. The bellows extends from the base part to enclose at least a portion of the shaft of the actuator motor. The bellows absorbs vibration of the actuator motor and to enable holding of the sealing cover.

20 Claims, 8 Drawing Sheets

(56) References Cited

U.S. PATENT DOCUMENTS

| | | | | |
|---|---|---|---|---|
| 2021/0222775 | A1 * | 7/2021 | Knepper | F16C 33/805 |
| 2024/0017710 | A1 * | 1/2024 | Usui | B60T 13/746 |
| 2025/0012119 | A1 * | 1/2025 | Berres | E05B 81/40 |

* cited by examiner

SEALING COVERS FOR ACTUATOR MOTORS

RELATED APPLICATION

The present application claims the benefit of Indian Patent Application Nos. X202311029819 filed Apr. 25, 2023, titled "Sealing Covers for Actuator Motors," the contents of which are hereby incorporated by reference.

BACKGROUND

Conventionally, vehicles, such as engine-powered vehicles, electric vehicles, and hybrid vehicles, include electrical and electronic components, such as actuator motors, Electronic Control Units (ECU), wire harness, display monitors, and the like. Such components in the vehicles are exposed to ingress. For example, during driving conditions, the vehicles may be exposed to dirt, sand, moisture, chemicals, and the like, which may penetrate into these components. The components are highly sensitive to ingress and the penetration of the ingress may cause damage of the components. In some cases, the penetration may lead to failure of the components and thereby, in some specific cases, leading to failure of vehicles.

Generally, a rating standard is used for classifying the ingress protection provided by these components. Specifically, International Electrotechnical Commission (IEC) in IEC 60529 certifies components based on the ingress protection provided by the components. Generally, the rating has two-digit character representation and is represented by Ingress Protection (IP) XY. A first digit (X) represents the amount of protection the component has against solid matter, such as dust particles. The second digit (Y) indicates level of protection provided by the component against liquids. Depending on the application where the component is used, different rating standard compliance is required.

SUMMARY

The present disclosure relates generally to an actuator motor assembly, such as vehicular components, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
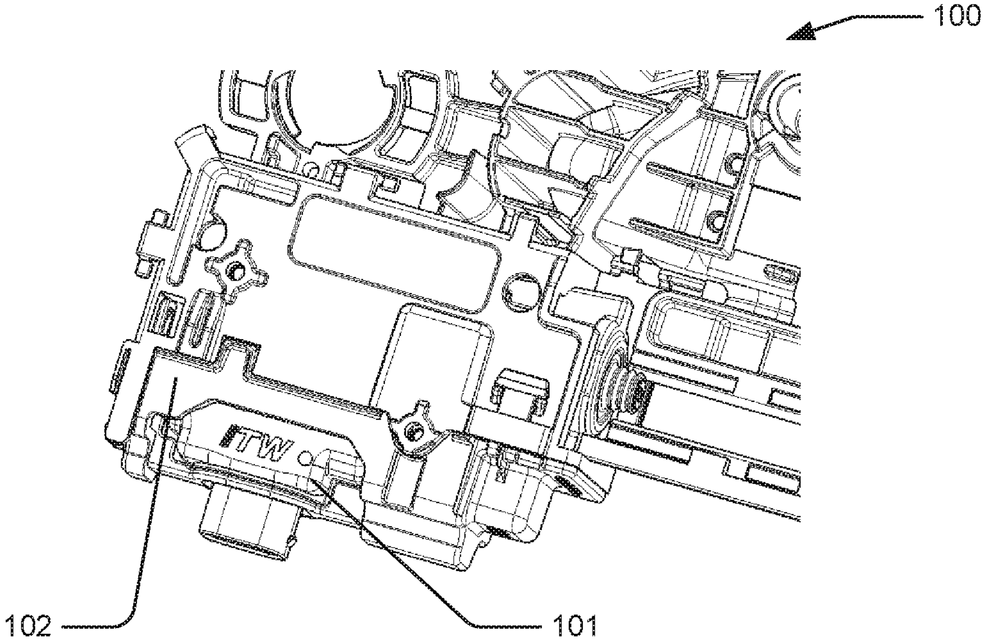
FIG. 1 illustrates an actuator motor assembly, in accordance with an implementation of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Generally, vehicles use actuator motors for various purposes. For example, actuator motors are used as a driving source to propel the vehicle, as a part of a starter assembly to start the vehicle, as a part of windshield wiper assembly to actuate windshield wiper, powering opening and closing of windows, in flush door handles to power opening and closing of doors, in fuel fillers, in charge port housings, and so on. During driving of the vehicle, the vehicle may be exposed to solid ingress, like dirt, mud, and debris. In some scenarios, when the vehicles are subjected to cleaning, the components may be exposed to liquid ingress, such as water and chemicals. The solid ingress may accumulate and may form insulative layers on actuator motors. The accumulation of the solid ingress may cause overheating and malfunctioning of the actuator motors. Similarly, the liquid ingress, such as water, may cause short circuiting in the actuator motors. This may cause malfunctioning of the actuator motors and thereby resulting in failure of the actuator motors in some cases. Therefore, the actuator motors used in vehicles require high Ingress protection (IP) rating standard. Particularly, IP 69 compliance is required for the actuator motors. The first digit (6) herein refers to dust-tight protection and no ingress of dust for two to eight hours. The second digit (9) herein refers to protection from liquid projected from a close range at high pressure and high temperature against the enclosure from any direction and that ingress of liquid shall have no harmful effects.

Some conventional actuator motors that are not IP 69 compliant may not be used in the vehicles as that would pose the risk of failure of the actuator motors. Further, the design of the conventional actuator motors may not be easily altered to make them IP 69 compliant. Therefore, to achieve IP 69 compliance for actuator motors to be used in vehicles, the actuator motors may have to be newly designed. This may increase the time required for the design and development and may increase the associated cost.

The present disclosure relates to a sealing cover for an actuator motor. In the present disclosure, a sealing cover is provided over the actuator motor to cover the actuator motor and to achieve IP 69 compliance. Accordingly, the present disclosure protects the actuator motors against solid and liquid ingress. Therefore, the present disclosure prevents damage and/or malfunctioning of the actuator motors. With the present disclosure, conventional actuator motors can be made to achieve IP 69 compliance. Therefore, the present disclosure eliminates the need to design new actuator motors that are IP 69 compliant and accordingly, eliminate the time required and cost associated with such design.

In an implementation of the present disclosure, an actuator motor assembly for vehicles may include an actuator motor and a sealing cover. The actuator motor that is to be used in a vehicle may be provided with the scaling cover to achieve ingress protection (IP) 69 compliance. The vehicle may be, for example, engine-driven vehicles, electric vehicles, or hybrid vehicle. The actuator motor may actuate at least one component of the vehicle. The actuator motor may be used, for example, as a driving source to propel the vehicles, to start the vehicle, to actuate windshield wiper, to open and close the windows, and so on.

The actuator motor may comprise a top portion, a bottom portion, a first side portion, a second side portion, and a shaft. The bottom portion may be opposite to the top portion. The second side portion may be opposite to the first side portion. Further, the first side portion and the second side portion may be perpendicular to the top portion and the bottom portion. The shaft may transfer motion from the actuator motor to the at least one component of the vehicle. At least a portion of the shaft protrudes out from the actuator motor.

The sealing cover may be removably disposed over the actuator motor to protect the actuator motor from ingress. In an example, the sealing cover may enclose a periphery of the actuator motor. Further, the sealing cover may enclose at least a portion of top and bottom portions of an outer surface of the actuator motor and side portions of the outer surface of the actuator motor.

In an example, the sealing cover may include a base part, a first web, and a second web. The base part may enclose the top portion and the bottom portion of the actuator motor. The first web may extend from the base part in a direction perpendicular to the base part. The first web may partially enclose the first side portion of the actuator motor. The second web may extend from the base part in a direction perpendicular to the base part. The second web may be parallel to the first web. The second web may partially enclose the second side portion of the actuator motor. The first web and the second web may enable tight gripping and proper holding of the sealing cover over the actuator motor. For example, in certain cases, the sealing cover may fall off from the actuator motor. For instance, during different driving conditions of the vehicle, such as during the uphill or downhill driving of the vehicle, during sudden braking/acceleration of the vehicle, or abrupt maneuvering of the vehicle, the actuator motor may undergo movement or vibrate. This may cause the removal of the sealing cover from the actuator motor. Accordingly, in such cases, ingress may penetrate into the actuator motor and thereby, may damage the actuator motor. Accordingly, to prevent such problems, the base part, the first web, and the second web may enable proper holding and a tight grip of the sealing cover over the actuator motor. In addition, the sealing cover may include a plurality of holding units to hold the sealing cover tightly against the actuator motor even during various driving conditions of the vehicle. In an example, the base part, the first web, and the second web may together form a u-shaped section.

Accordingly, in an example, the sealing cover may include a bellows. Particularly, in the assembled condition of the sealing cover over the actuator motor, the bellows may be disposed at the end of the actuator motor through which the shaft of the actuator motor protrudes out. Accordingly, the bellows may enclose at least a portion of the shaft of the actuator motor. The bellows may absorb vibration or movement of the actuator motor that is caused during driving of the vehicle and may enable holding of the sealing cover on the actuator motor in place.

In some scenarios, during the assembly of the sealing cover over the actuator motor, the sealing cover may tear. Accordingly, to prevent tearing of the sealing cover and to provide better sealing, the sealing cover may include a ball ring disposed proximate to the bellows of the scaling cover. In the assembled condition of the cover with the actuator motor, the ball ring may be disposed at a neck of the actuator motor. The neck may be a portion through which the shaft of the actuator motor protrudes out through. In addition to providing better sealing and preventing tearing of the sealing cover, the ball ring provides better geometrical stability of the sealing cover when assembled with the actuator and enhances holding of the sealing cover (sealing engagement) over the actuator motor, specifically at the neck of the actuator motor. The disposing of the ball ring at the neck of the actuator motor provides, for example, a compression fit that enhances sealing. In an example, the ball ring may be substantially ring-shaped. Further, the ball ring may have a substantially circular cross-section.

In an example, shape of the sealing cover may correspond to the shape of the actuator motor. Accordingly, in an example, the actuator motor may include at least one stepped section and the sealing cover may include at least one stepped section to enclose corresponding stepped section of the actuator motor. This enables better holding of the sealing cover over the actuator motor. The shape of the sealing cover being corresponding to the shape of the actuator motor provides improved fit and protection against ingress. Further, the sealing cover may include a plurality of projections to align with corresponding projections of the actuator motor. The shape of the plurality of projections of the scaling cover may correspond to the shape of the projections on the actuator motor. In an example, the plurality of projections may be of rectangular shape. The provision of the plurality of projections also enables better holding of the sealing cover. For instance, assume that there are projections in the actuator motor and the sealing cover does not have the plurality of projections to align with the projections in the actuator motor. This may cause removal of the sealing cover from the actuator motor during different driving conditions of the vehicle. The provision of the plurality of projections in the sealing cover thus prevents the removal of the sealing cover from the actuator motor.

In addition to complying with IP 69 standard, the sealing cover may have to ensure flexibility to assemble over the actuator motor. Moreover, the sealing cover may have to be made of a material that ensures stability to prevent tearing of the sealing cover during assembly of the sealing cover or during working of the vehicle. Therefore, the sealing cover may have to be made of material that has higher elongation, higher stability, higher tear strength, higher tensile strength, and lesser hardness (shore A hardness). In an example, the sealing cover may be made, for example, of ethylene propylene diene monomer (EPDM). In another example, the sealing cover may be made of silicone rubber. The material of the sealing cover may be formulated to have shore A hardness of about 41, a tensile strength of about 9 MPa, an elongation at break of about 690%, and a tear strength of about 15 KN/m and good stability up to 20° C.

With the present disclosure, a sealing cover is provided over the actuator motor to achieve IP 69 compliance. For instance, the sealing cover may have a U-shaped cross-section, and may have a plurality of holding units, such as the bellows and the ball ring, that enable proper holding and a tight grip of the sealing cover over the actuator motor. Accordingly, the scaling cover is held tightly over the actuator motor even during different driving conditions of the vehicle. Accordingly, the present disclosure protects the actuator motors against solid and liquid ingress. Therefore, the present disclosure prevents damage and/or malfunctioning of the actuator motors. With the present disclosure, conventional actuator motors can be made to achieve IP 69 compliance. Therefore, the present disclosure eliminates the requirement to design new actuator motors that are IP 69 compliant and accordingly, eliminate the time required and cost associated with manufacturing such new design.

The ball ring enables better sealing, improved retention of the sealing cover on the actuator, and enhanced stability of the sealing cover when assembled with the actuator. The ball ring also prevents tearing of the sealing cover during assembly of the sealing cover over the actuator. The material of the sealing cover also ensures higher stability. higher elongation to prevent tearing of the sealing cover, higher tear strength, higher tensile strength, and lesser hardness (shore A hardness).

The above and other features, aspects, and advantages of the subject matter will be better explained with regard to the following description, and accompanying figures. It should be noted that the description and figures merely illustrate the principles of the present disclosure along with examples described herein and, should not be construed as a limitation to the present disclosure. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

Figure 2:
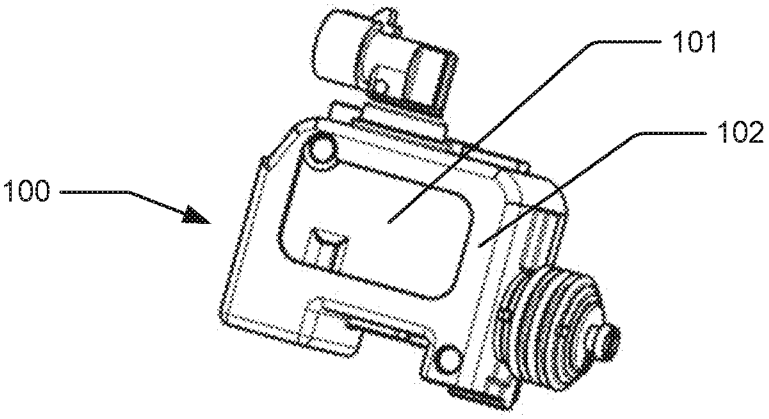
FIG. 2 illustrates an actuator motor assembly, in accordance with an implementation of the present disclosure.

FIG. 1 illustrates an actuator motor assembly 100, in accordance with an implementation of the present disclosure. FIG. 2 illustrates the actuator motor assembly 100, in accordance with an implementation of the present disclosure. For the sake of brevity, FIGS. 1 and 2 are explained in conjunction with each other. The actuator motor assembly 100 may be used in a vehicle (not shown in FIGS. 1 and 2). The vehicle may be, for example, engine-driven vehicles, electric vehicles, or hybrid vehicle. The actuator motor assembly 100 may include an actuator motor 101 and a sealing cover 102. The actuator motor 101 may be used to actuate at least one component of the vehicle. For example, the actuator motor 101 may be used as a driving source to propel the vehicles, to start the vehicle, to actuate windshield wiper, to open and close the windows, and so on.

In an example, the sealing cover 102 may be removably disposed over the actuator motor 101 to protect the actuator motor 101 from ingress. The actuator motor 101 may be enclosed with the sealing cover 102 to achieve ingress protection (IP) 69 compliance. In other words, with the use of the sealing cover 102 over the actuator motor 101, dust-tight protection may be provided with no ingress of dust for two to eight hours. Further, ingress protection from liquid projected from a close range at high pressure and high temperature against the enclosure from any direction may be provided and ingress of liquid, such as water, and the like, shall have no harmful effects.

Referring to FIG. 2, the sealing cover 102 may cover at least a periphery of the actuator motor 101. In the view depicted herein, the sealing cover 102 may cover at least a portion of a top and bottom portions of the actuator motor 101. Further, the sealing cover 102 may enclose at least a portion of side portions of the actuator motor 101. In a particular example, the sealing cover 102 may fully enclose top and bottom portions of the actuator motor. The higher amount of enclosure of the sealing cover 102 over the actuator motor 101 may provide a better sealing and a better holding of the sealing cover 102 with the actuator motor 101.

Figure 3A:
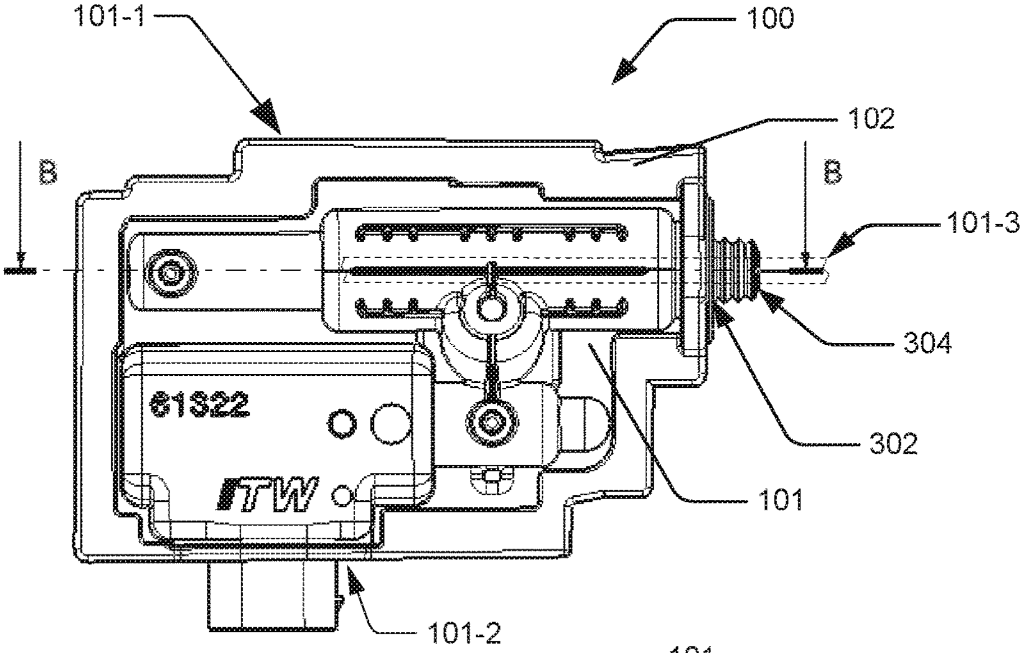
FIG. 3*a* illustrates a front view of an actuator motor assembly, in accordance with an implementation of the present disclosure.
Figure 3B:
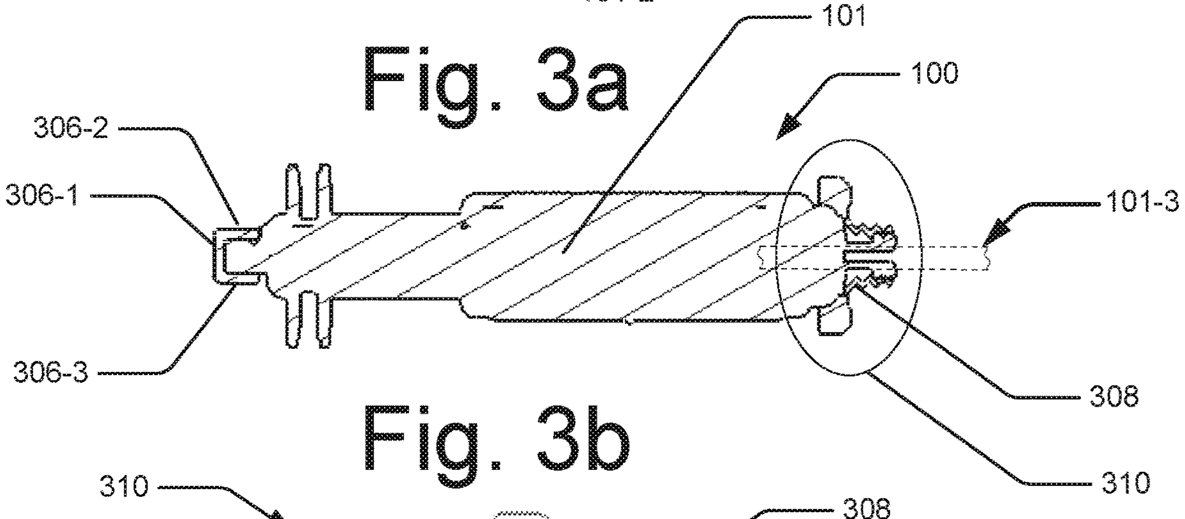
FIG. 3*b* illustrates a sectional view of the section B-B taken in the view depicted in FIG. 3*a*, in accordance with an implementation of the present disclosure.
Figure 3C:
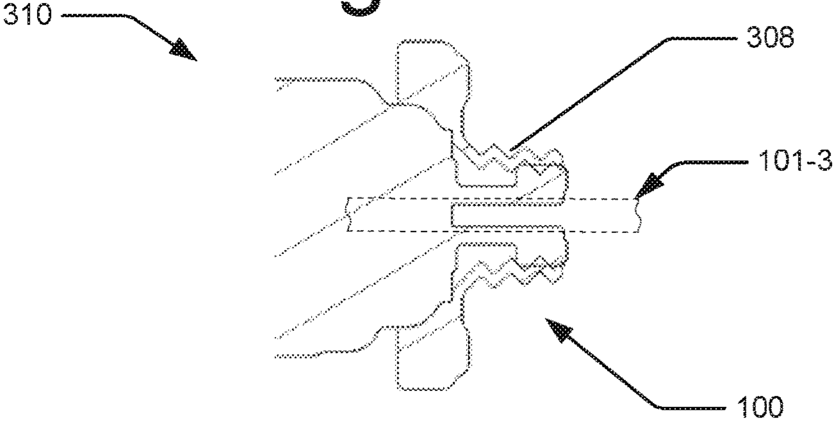
FIG. 3*c* illustrates an enlarged view of a portion depicted in FIG. 3*b*, in accordance with an implementation of the present disclosure.

FIG. 3*a* illustrates a front view of the actuator motor assembly 100, in accordance with an implementation of the present disclosure. FIG. 3*b* illustrates a sectional view of the section B-B taken in the view depicted in FIG. 3*a*, in accordance with an implementation of the present disclosure. FIG. 3*c* illustrates an enlarged view of a portion depicted in FIG. 3*b*, in accordance with an implementation of the present disclosure. For the sake of brevity, FIGS. 3*a*-3*c* are explained in conjunction with each other. The actuator motor 101 may include a neck 302 that has a lesser diameter than other portions of the actuator motor 101. Further, the actuator motor 101 may include a shaft 101-3 which transfers the motion from the actuator motor 101 to at least one component (not shown in FIG. 3*a*-3*c*) that is coupled to the shaft 101-3. In an example, the shaft 101-3 may protrude from an end 304 of the actuator motor 101 through the neck 302.

The sealing cover 102 may be at risk of detaching from the actuator motor 101 during different driving conditions of the vehicle, such as during the uphill or downhill driving of the vehicle, during sudden braking/acceleration of the vehicle, or abrupt maneuvering of the vehicle.

In an example, the sealing cover 102 may include a base part 306-1, a first web 306-2, and a second web 306-3. The base part 306-1 may enclose the top portion 101-1 and the bottom portion 101-2 of the actuator motor 101. The first web 306-2 may extend from the base part 306-1 in a direction perpendicular to the base part 306-1. The first web 306-2 may partially enclose the first side portion of the actuator motor 101. The second web 306-3 may extend from the base part 306-1 in a direction perpendicular to the base part 306-1. The second web 306-3 may be parallel to the first web 306-2. The second web 306-3 may partially enclose the second side portion of the actuator motor 101. The first web 306-2 and the second web 306-3 may enable tight gripping and proper holding of the sealing cover 102 over the actuator motor 101. For example, in certain cases, the sealing cover 102 may fall off from the actuator motor 101. For instance, during different driving conditions of the vehicle, such as during uphill or downhill driving of the vehicle, during sudden braking/acceleration of the vehicle, or abrupt maneuvering of the vehicle, the actuator motor 101 may undergo movement or vibrate. This may cause removal of the sealing cover 102 from the actuator motor 101. Accordingly, in such cases, ingress may penetrate into the actuator motor 101 and thereby, may cause damage of the actuator motor 101. Accordingly, to prevent such problems, the base part 306-1, the first web 306-2, and the second web 306-3 may enable proper holding and a tight grip of the sealing cover 102 over the actuator motor 101. In addition, the sealing cover 102 may include a plurality of holding units to hold the sealing cover 102 tightly against the actuator motor 101 even during various driving conditions of the vehicle. In an example, the base part 306-1, the first web 306-2, and the second web 306-3 may together form a U-shaped section, as depicted in FIG. 3*b*. The U-shaped cross-section may enable proper holding and a tight grip of the sealing cover 102 over the actuator motor 101.

In an aspect, the sealing cover 102 may include a bellows 308. The bellows 308 may be disposed at the end 304 of the actuator motor 101 where the shaft 101-3 protrudes out of the actuator motor 101. The bellows 308 may absorb vibration or movement of the actuator motor 101 that is caused during driving of the vehicle or during operation of the actuator motor 101, and may enable holding of the sealing cover 102 on the actuator motor 101 in place, as will be explained below.

Figure 4A:
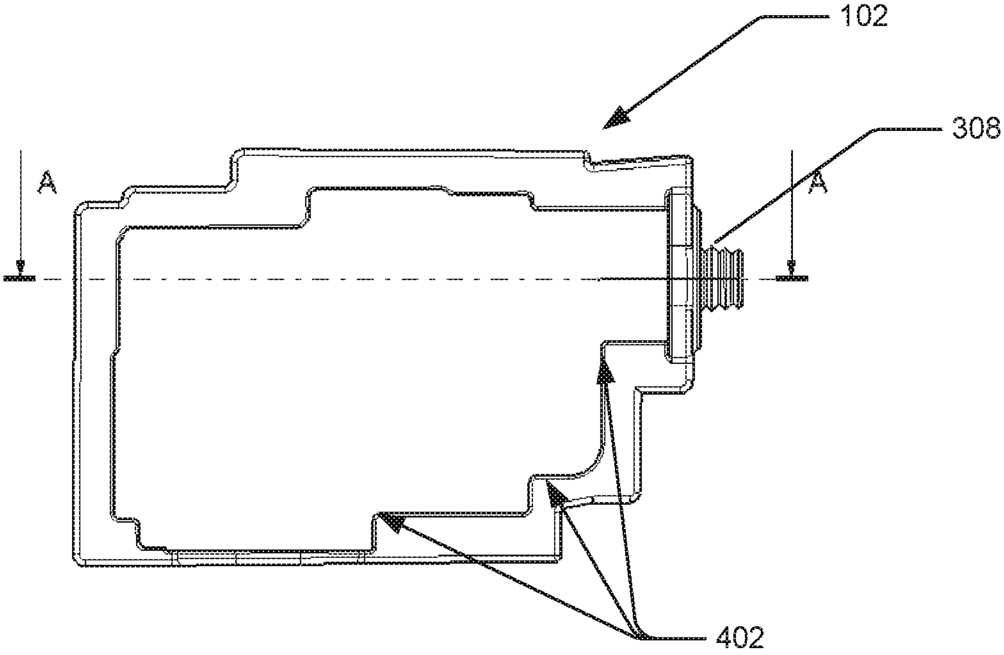
FIG. 4*a* illustrates a front view of a sealing cover for an actuator motor, in accordance with an implementation of the present disclosure.
Figure 4B:
FIG. 4*b* illustrates a sectional view of a section A-A taken in the view depicted in FIG. 4*a*, in accordance with an implementation of the present disclosure.
Figure 5A:
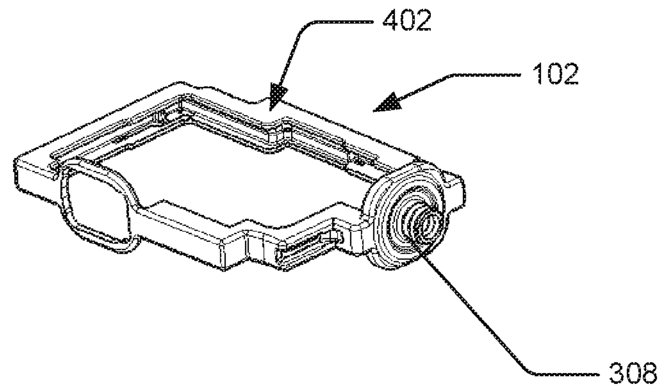
FIG. 5*a* illustrates a perspective view of a sealing cover, in accordance with an implementation of the present disclosure.
Figure 5B:
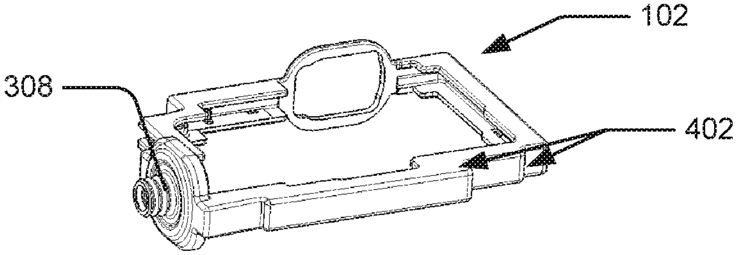
FIG. 5*b* illustrates a perspective view of a sealing cover, in accordance with an implementation of the present disclosure.

FIG. 4*a* illustrates a front view of the scaling cover 102 for the actuator motor 101, in accordance with an implementation of the present disclosure. FIG. 4*b* illustrates a sectional view of a section A-A taken in the view depicted in FIG. 4*a*, in accordance with an implementation of the present disclosure. FIG. 5*a* illustrates a perspective view of the scaling cover 102, in accordance with an implementation of the present disclosure. FIG. 5*b* illustrates a perspective view of the sealing cover 102, in accordance with an implementation of the present disclosure. For the sake of brevity, FIGS. 4*a*, 4*b*, 5*a*, and 5*b* are explained in conjunction with each other.

Referring to FIGS. 4*a*, 5*a*, and 5*b*, the shape of the sealing cover 102 may correspond to the shape of the actuator motor 101. In an example, the sealing cover 102 may be substantially rectangular in shape. In the views depicted herein, the sealing cover 102 may have stepped section 402 to accommodate a corresponding portion in the actuator motor 101.

Referring to FIGS. 4*b*, 5*a*, and 5*b*, the sealing cover 102 may have a U-shaped cross-section. In addition, as explained earlier, the sealing cover 102 also includes the bellows 308 at one end, which, when assembled with the actuator motor 101, is disposed on the end 304 (not shown in FIGS. 4*a*-5*b*) of the actuator motor 101 through which the shaft 101-3 (not shown in FIGS. 4*a*-5*b*) penetrates out. The use of the bellows 308 imparts flexibility to the sealing cover 102. For instance, when there is no movement/vibration of the actuator motor 101, the bellows 308 are in a compressed state. When there is movement/vibration of the actuator motor 101 corresponding to the portion where the bellows 308 is disposed, the bellows 308 expand along an axial direction in the view depicted herein. This expansion of the bellows 308 may correspond to the movement/vibration of the actuator motor 101 caused along the axial direction during operation of the actuator motor 101 or during different driving conditions of the vehicle. Therefore, the bellows 308 enable holding of the sealing cover 102 with the actuator motor 101 even during different driving conditions.

Further, the sealing cover 102 may have to ensure flexibility to assemble over the actuator motor 101. In this regard, the sealing cover 102 may need to have higher elongation to prevent tearing of the sealing cover 102 during assembly of the sealing cover 102 or during the working of the vehicle. Further, the sealing cover 102 may need to have higher stability, higher tear strength, higher tensile strength, and lesser hardness (shore A hardness). The sealing cover 102 may have to be made of material having such properties. Accordingly, in an example, the sealing cover 102 may be made, for example, of ethylene propylene diene monomer (EPDM) or silicone rubber. The material of the sealing cover 102 may be formulated to have shore A hardness of about 41, tensile strength of about 9 MPa, elongation at break of about 690%, and a tear strength of about 15 KN/m and good stability up to 20° C. Accordingly, as can be seen from the properties, the sealing cover 102 has better stability, higher tensile strength, lesser hardness, higher tear strength, and higher elongation.

Figure 6A:
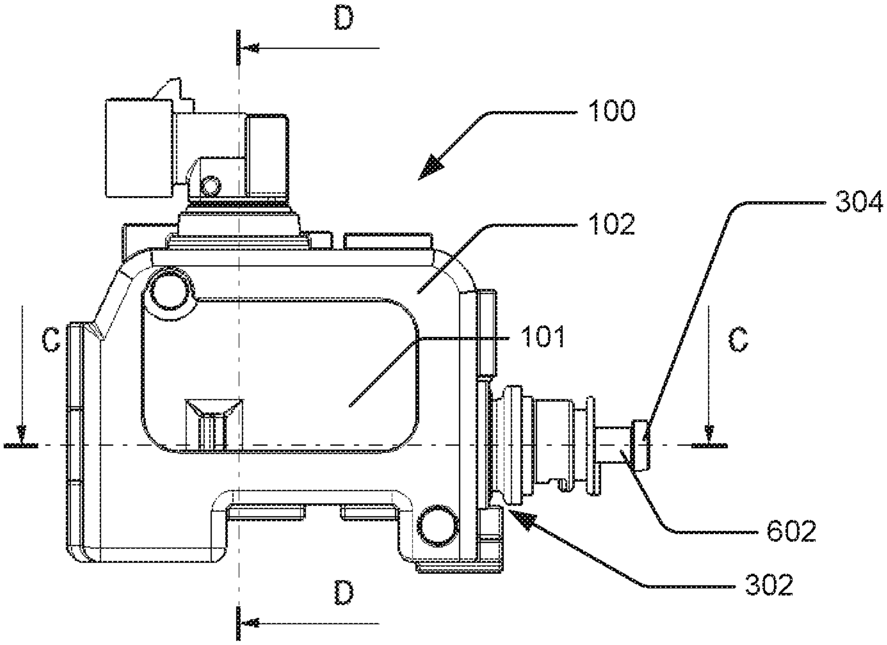
FIG. 6*a* illustrates a front view of a sealing cover for an actuator motor assembly, in accordance with an implementation of the present disclosure.
Figure 6B:
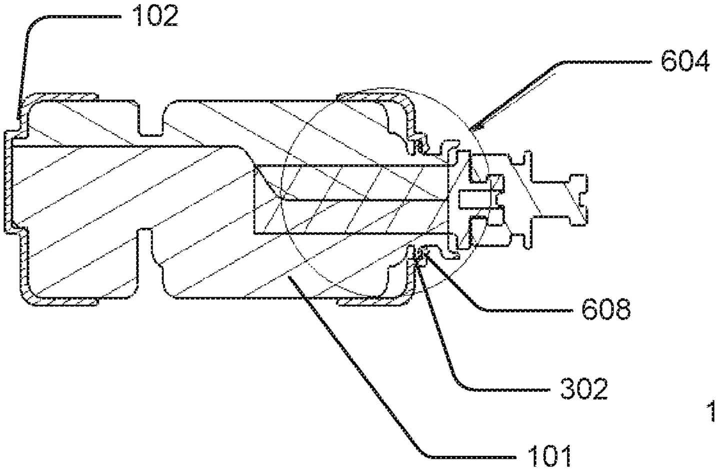
FIG. 6*b* illustrates a sectional view of a section C-C taken in the view depicted in FIG. 6*a*, in accordance with an implementation of the present disclosure.
Figure 6C:
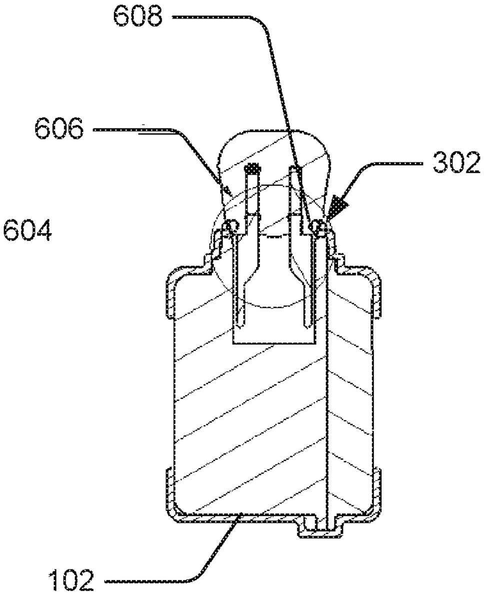
FIG. 6*c* illustrates a sectional view of a section D-D taken in the view depicted in FIG. 6*a*, in accordance with an implementation of the present disclosure.
Figure 6D:
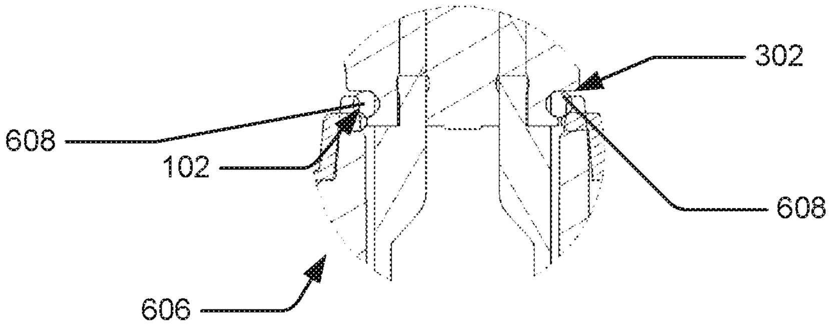
FIG. 6*d* illustrated an enlarged view of a portion depicted in FIG. 6*b*, in accordance with an implementation of the present disclosure.
Figure 6E:
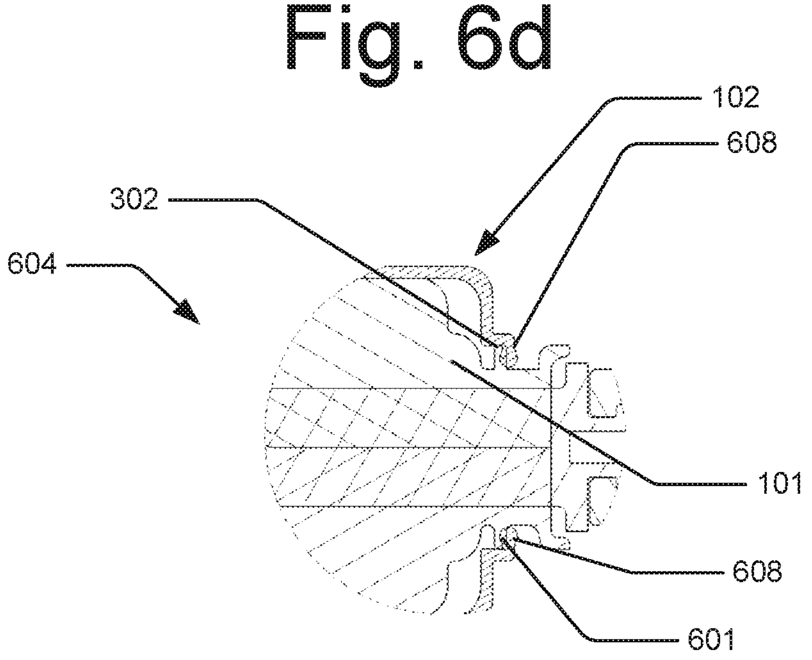
FIG. 6*e* illustrated an enlarged view of a portion depicted in FIG. 6*c*, in accordance with an implementation of the present disclosure.

FIG. 6*a* illustrates a front view of the scaling cover 102 for the actuator motor assembly 100, in accordance with an implementation of the present disclosure. FIG. 6*b* illustrates a sectional view of a section C-C taken in the view depicted in FIG. 6*a*, in accordance with an implementation of the present disclosure. FIG. 6*c* illustrates a sectional view of a section D-D taken in the view depicted in FIG. 6*a*, in accordance with an implementation of the present disclosure. FIG. 6*d* illustrated an enlarged view of a portion 606 depicted in FIG. 6*b*, in accordance with an implementation of the present disclosure. FIG. 6*e* illustrated an enlarged view of a portion 604 depicted in FIG. 6*c*, in accordance with an implementation of the present disclosure. For the sake of brevity, FIGS. 6*a*-6*e* are explained in conjunction with each other.

In some scenarios, during the assembly of the sealing cover 102 over the actuator motor 101, the sealing cover 102 may tear. Especially, during the assembly of the sealing cover 102 at the neck 302, the sealing cover 102 may be susceptible to tearing. Further, at the neck 302 of the actuator motor 101, the sealing cover 102 may be imperfect. For instance, in some scenarios, if the neck 302 has a square-edge, the sealing cover 102 may not provide a proper sealing over the neck 302. This may enable penetration of the ingress into the actuator motor 101.

Accordingly, to prevent tearing of the sealing cover 102 and to provide better scaling, the sealing cover 102 may include a ball ring 608 disposed proximate to the bellows 308 (not shown in FIGS. 6*a*-6*c*) of the sealing cover 102. In the assembled condition of the sealing cover 102 with the actuator motor 101, the ball ring 608 may be disposed at the neck 302 of the actuator motor 101. The ball ring 608 may have a substantially ring shape with a substantially circular cross-section. The ball ring 608 may engage with the neck 302 of the actuator motor 101 to provide a better holding of the sealing cover 102 with the actuator motor 101 and a better sealing. The ball ring 608 provides better geometrical stability of the sealing cover 102 when assembled with the actuator motor 101 and prevents tearing of the sealing cover 102. For instance, when the neck 302 has a round-edge, the ball ring 608 may have a better alignment along the round-edge and may provide a better contact with the neck 302. When the neck 302 has a substantially square-edge, the ball ring 608 may have points of contact at least at two portions of the neck 302. Therefore, the ball ring 608 enables better sealing and higher geometrical stability.

In an example, the amount of material of the sealing cover 102 at portion of the ball ring 608 may be different than amount of material at other portions of the sealing cover 102. Particularly, the amount of material of the sealing cover 102 at portion of the ball ring 608 may be higher than amount of material at other portions of the sealing cover 102. Accordingly, properties of the material of the sealing cover 102 may vary from the ball ring 608 to other portions of the sealing cover 102. This may cause splitting or cracking of the sealing cover 102. Further, the sealing cover 102 may have a higher hardness at the ball ring 608 than the other portions. Accordingly, the material of the sealing cover 102 is formulated so as to ensure that the variation in the material properties due to the ball ring 608 and the hardness at the ball ring 608 of the sealing cover 102 do not cause splitting or cracking of the sealing cover 102.

Figure 7A:
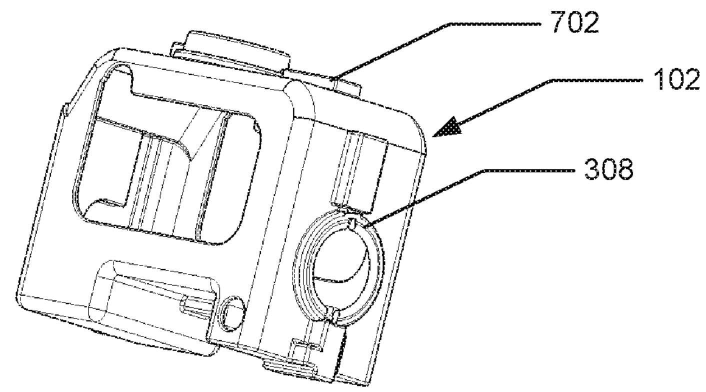
FIG. 7*a* illustrates a bottom perspective view of a sealing cover for an actuator motor, in accordance with an implementation of the present disclosure.
Figure 7B:
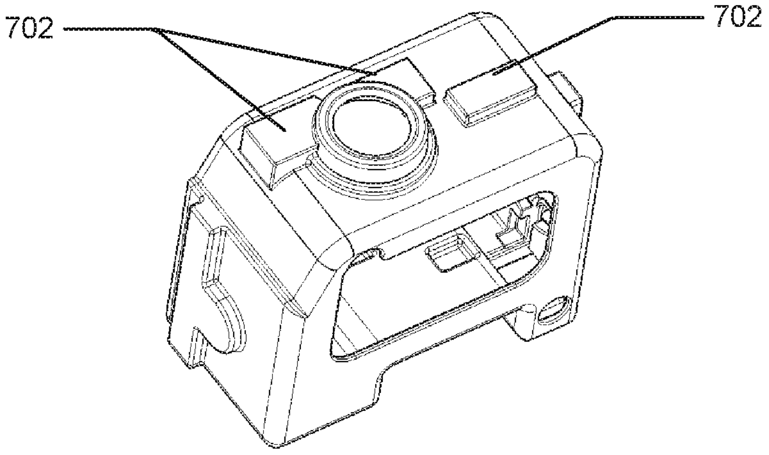
FIG. 7*b* illustrates a top perspective view of a sealing cover for an actuator motor, in accordance with an implementation of the present disclosure.
Figure 7C:
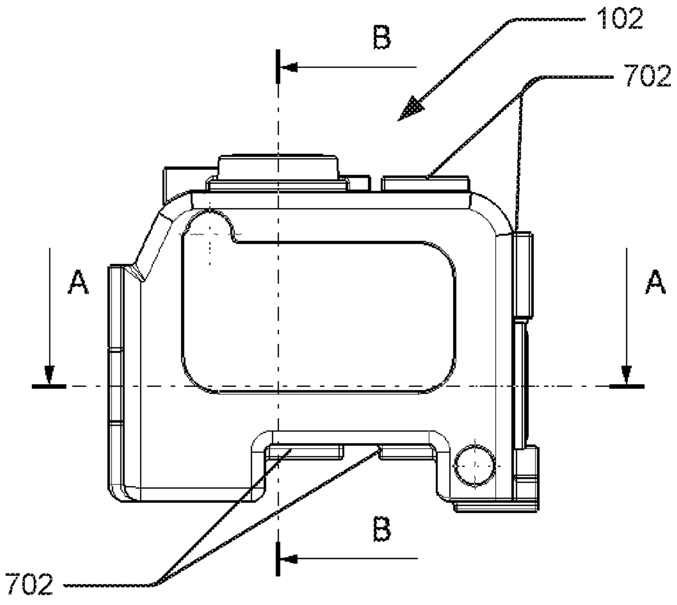
FIG. 7*c* illustrates a front view of a sealing cover for an actuator motor, in accordance with an implementation of the present disclosure.
Figure 7D:
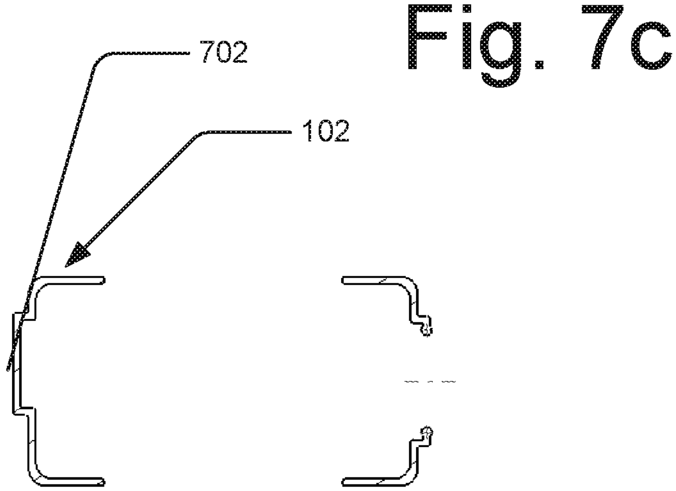
FIG. 7*d* illustrates a sectional view of Section A-A taken in the view depicted in FIG. 7*c*, in accordance with an implementation of the present disclosure.
Figure 7E:
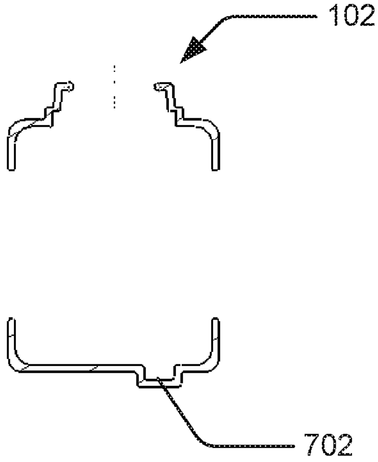
FIG. 7*e* illustrates a sectional view of Section B-B taken in the view depicted in FIG. 7*c*, in accordance with an implementation of the present disclosure.

FIG. 7*a* illustrates a bottom perspective view of the sealing cover 102 for the actuator motor 101, in accordance with an implementation of the present disclosure. FIG. 7*b* illustrates a top perspective view of the sealing cover 102 for the actuator motor 101, in accordance with an implementation of the present disclosure. FIG. 7*c* illustrates a front view of the sealing cover 102 for the actuator motor 101, in accordance with an implementation of the present disclosure. FIG. 7*d* illustrates a sectional view of Section A-A taken in the view depicted in FIG. 7*c*, in accordance with an implementation of the present disclosure. FIG. 7*e* illustrates a sectional view of Section B-B taken in the view depicted in FIG. 7*c*, in accordance with an implementation of the present disclosure. For the sake of brevity, FIGS. 7*a*-7*e* are explained in conjunction with each other. As mentioned earlier, the sealing cover 102 may have a shape corresponding to shape of the actuator motor 101. In an example, the actuator motor 101 may have a first plurality of projections (not shown in FIGS. 7*a*-7*e*) on the outer surface of the actuator motor 101. Accordingly, the sealing cover 102 may include a second plurality of projections 702 to align and engage with the first plurality of projections of the actuator motor 101. The shape of the second plurality of projections 702 may correspond to the shape of the first plurality of projections on the actuator motor 101. In an example, each of the second plurality of projections 702 may be of rectangular shape. The provision of the second plurality of projections 702 enable better holding of the sealing cover 102. For instance, if there are no projections in the sealing cover 102 to correspond to the projections of the actuator motor 101, the sealing cover 102 may get removed from the actuator motor 101 during working of actuator motor 101 and/or during different driving conditions of the vehicle. By engaging with the first plurality of projections on the actuator motor 101, the second plurality of projections 702 prevents the removal of the sealing cover 102 from the actuator motor 101.

With the present disclosure, the sealing cover is provided over the actuator motor to achieve IP 69 compliance. For instance, the sealing cover may have a U-shaped cross-section and may include holding units, such as the bellows and the ball ring, that enable proper holding and a tight grip of the sealing cover over the actuator motor. Accordingly, the sealing cover is held tightly over the actuator motor even during different driving conditions of the vehicle. Accordingly, the present disclosure protects the actuator motors against solid and liquid ingress. Therefore, the present disclosure prevents damage and/or malfunctioning of the actuator motors. With the present disclosure, conventional actuator motors can be made to achieve IP 69 compliance. Therefore, the present disclosure eliminates the requirement to design new actuator motors that are IP 69 compliant and accordingly, eliminate the time required and cost associated with such design.

The ball ring enables better sealing, better holding of the sealing cover with the actuator, and higher stability of the sealing cover when assembled with the actuator. The ball ring also prevents tearing of the sealing cover during assembly of the sealing cover over the actuator. The material of the sealing cover also ensures higher stability and higher elongation to prevent tearing of the sealing cover, higher tear strength, higher tensile strength, and lesser hardness (shore A hardness).

Although the present disclosure has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

What is claimed is:

1. A sealing cover for an actuator motor in a vehicle, the sealing cover comprising:
   - a base part to enclose a top portion and a bottom portion of the actuator motor;
   - a first web extending from the base part in a direction perpendicular to the base part, wherein the first web is to partially enclose a first side portion of the actuator motor;
   - a second web extending from the base part in a direction perpendicular to the base part and being parallel to the first web, wherein the second web is to partially enclose a second side portion of the actuator motor, the second side portion being opposite to the first side portion, wherein the first side portion and the second side portion are perpendicular to the top portion and the bottom portion,
   - wherein the first web and the second web are to enable tight gripping of the sealing cover over the actuator motor; and
   - a bellows extending from the base part to enclose at least a portion of a shaft of the actuator motor, wherein the bellows is to absorb vibration of the actuator motor and to enable holding of the sealing cover, wherein the shaft protrudes out from the actuator motor and is configured to transfer motion from the actuator motor to at least one component of the vehicle, wherein the sealing cover is a separate elastomeric member comprising an elastomeric material and is elastically deformable to be removably fitted over at least a portion of the actuator motor.

2. The sealing cover as claimed in claim 1 comprising at least one stepped section to correspond to a stepped section of the actuator motor.

3. The sealing cover as claimed in claim 1, wherein the base part, the first web, and the second web forms a U-shaped section.

4. The sealing cover as claimed in claim 1, comprising a ball ring to provide geometrical stability of the sealing cover and to enhance sealing engagement of the sealing cover with the actuator motor, wherein the ball ring is disposable over a neck of the actuator motor, and wherein the shaft of the actuator motor protrudes out of the actuator motor through the neck.

5. The sealing cover as claimed in claim 4, wherein the ball ring is substantially ring-shaped.

6. The sealing cover as claimed in claim 4, wherein the ball ring has a substantially circular cross-section.

7. The sealing cover as claimed in claim 1, wherein the sealing cover is made of at least one of: ethylene propylene diene monomer (EPDM) and silicone rubber.

8. The sealing cover as claimed in claim 1, wherein material of the sealing cover has shore A hardness of about 41, tensile strength of about 9 MPa, elongation at break of about 690%, a tear strength of about 15 KN/m, and stability up to 20° C.

9. The sealing cover as claimed in claim 1, further comprising a plurality of projections configured to align with and engage corresponding projections on the actuator motor to prevent removal of the sealing cover from the actuator motor.

10. The sealing cover as claimed in claim 1, wherein, when removably fitted on the actuator motor, the base part fully encloses the top portion and the bottom portion of the actuator motor, and the first web and the second web enclose the first side portion and the second side portion, respectively, such that the sealing cover achieves ingress protection (IP) 69 compliance.

11. An actuator motor assembly for vehicles, comprising:
   - an actuator motor for actuation of at least one component of a vehicle, wherein the actuator motor comprises:
     - a top portion;
     - a bottom portion opposite to the top portion; a first side portion; a second side portion, wherein the second side portion is opposite to the first side portion, wherein the first side portion and the second side portion are perpendicular to the top portion and the bottom portion; and
     - a shaft to transfer motion from the actuator motor to the at least one component of the vehicle, wherein at least a portion of the shaft protrudes out from the actuator motor;
   - a sealing cover removably disposed over the actuator motor to protect the actuator motor from ingress, the sealing cover being a separate elastomeric member comprising an elastomeric material and being elastically deformable to be fitted over at least a portion of the actuator motor, wherein the sealing cover comprises: a base part to enclose the top portion and the bottom portion of the actuator motor;
   - a first web extending from the base part in a direction perpendicular to the base part, wherein the first web is to partially enclose the first side portion of the actuator motor; and
   - a second web extending from the base part in a direction perpendicular to the base part and being parallel to the first web,
   - wherein the second web is to partially enclose the second side portion of the actuator motor, wherein the first web and the second web are to enable tight gripping of the sealing cover over the actuator motor; and
     - a bellows to absorb vibration of the actuator motor and to enable holding of the sealing cover and to enclose at least a portion of the shaft of the actuator motor.

12. The actuator motor assembly as claimed in claim 11, wherein the sealing cover comprises at least one stepped section to correspond to a stepped section of the actuator motor.

13. The actuator motor assembly as claimed in claim 11, wherein the base part, the first web, and the second web forms a U-shaped section.

14. The actuator motor assembly as claimed in claim 11, wherein the shape of the sealing cover corresponds substantially to the shape of the actuator motor.

15. The actuator motor assembly as claimed in claim 11, wherein the sealing cover comprises a ball ring to provide geometrical stability of the sealing cover and to enhance sealing engagement of the sealing cover with the actuator motor, and wherein the ball ring is disposable over a neck of the actuator motor, wherein the shaft of the actuator motor protrudes out of the actuator motor through the neck.

16. The actuator motor assembly as claimed in claim 15, wherein the ball ring is substantially ring-shaped.

17. The actuator motor assembly as claimed in claim 15, wherein the ball ring has a substantially circular cross-section.

18. The actuator motor assembly as claimed in claim 11, wherein the sealing cover is made of at least one of: ethylene propylene diene monomer (EPDM) and silicone rubber.

19. The actuator motor assembly as claimed in claim 11, wherein material of the sealing cover has shore A hardness of about 41, tensile strength of about 9 MPa, elongation at break of about 690%, and a tear strength of about 15 KN/m and stability up to 20° C.

20. The actuator motor assembly as claimed in claim 11, wherein the actuator motor comprises a neck having a lesser diameter than other portions of the actuator motor, and the shaft protrudes from the actuator motor through the neck.

* * * * *